Figure 1:
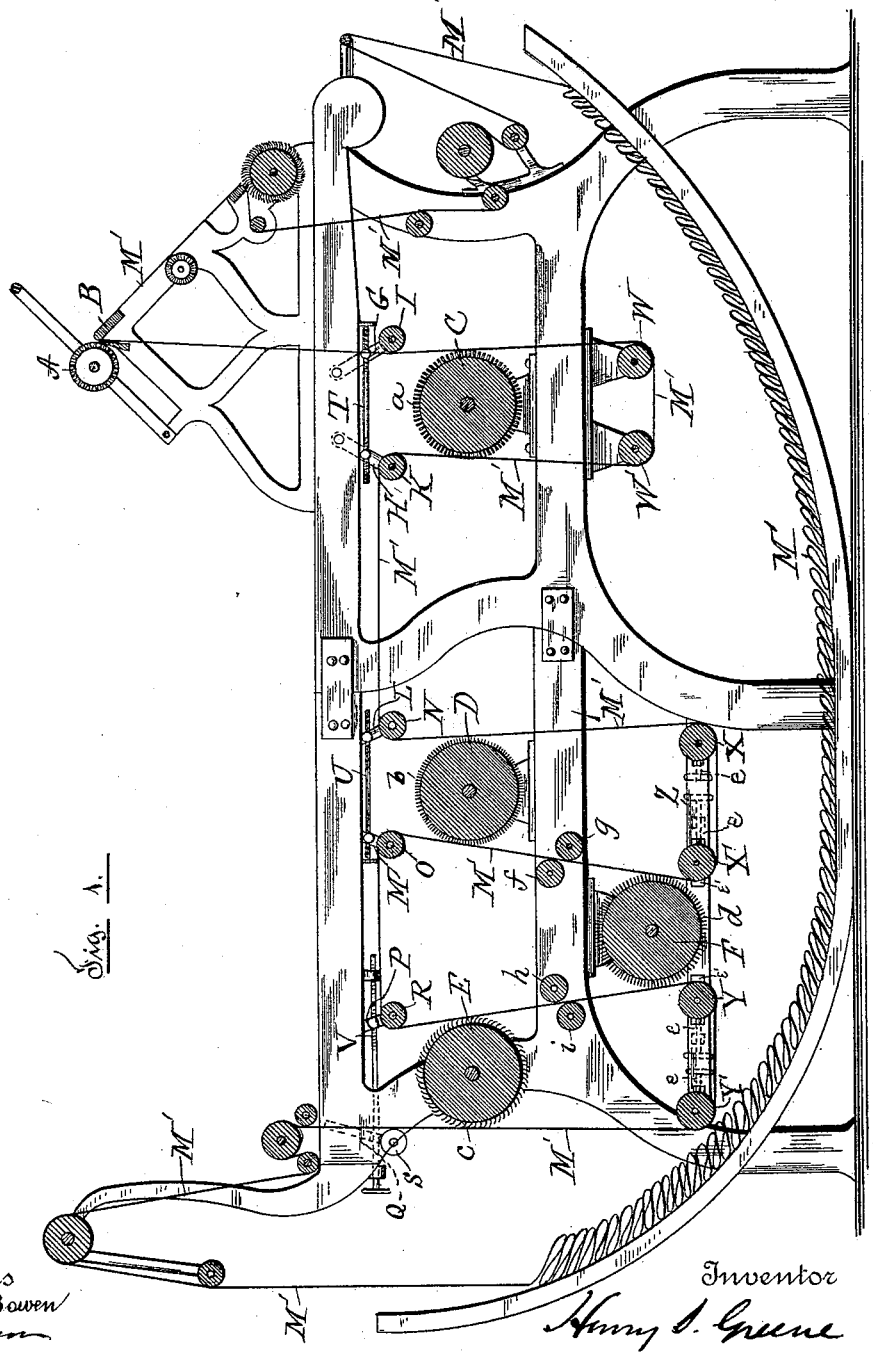

(No Model.) 2 Sheets—Sheet 1.

H. S. GREENE.
COMBINED GIGGING AND SHEARING MACHINE.

No. 449,620. Patented Mar. 31, 1891.

Witnesses
Walter T. Bowen
A. D. Harrison

Inventor
Henry S. Greene
By his Attorneys.
Wright, Brown & Crossley.

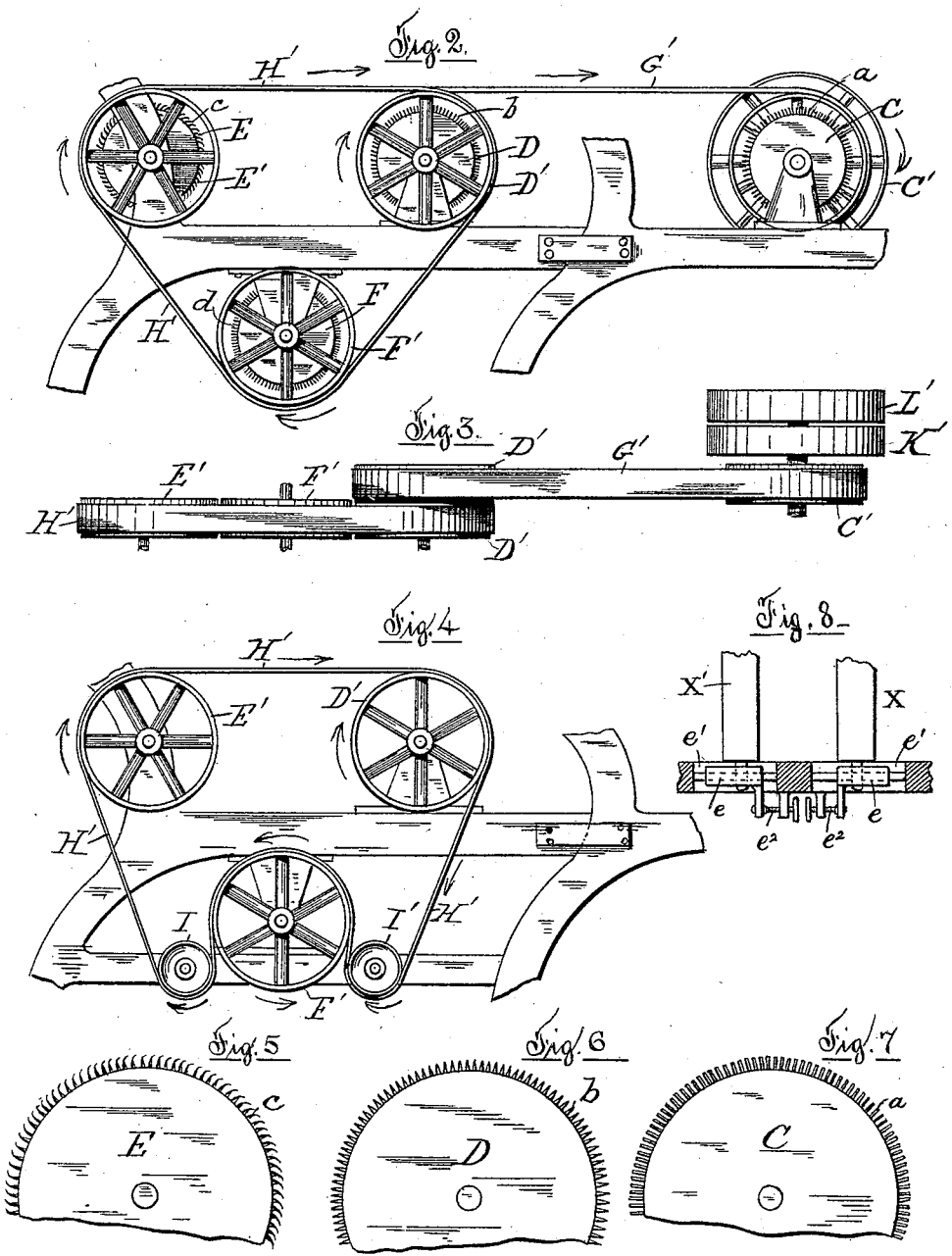

UNITED STATES PATENT OFFICE.

HENRY S. GREENE, OF LAWRENCE, MASSACHUSETTS.

COMBINED GIGGING AND SHEARING MACHINE.

SPECIFICATION forming part of Letters Patent No. 449,620, dated March 31, 1891.

Application filed October 21, 1889. Serial No. 327,639. (No model.)

*To all whom it may concern:*

Be it known that I, HENRY S. GREENE, of Lawrence, in the county of Essex and State of Massachusetts, have invented certain new and useful Improvements in Combined Gigging and Shearing Machines, of which the following is a specification.

My invention consists, generally, in an improved apparatus for finishing cloth, whereby the nap is first opened and then pulled out, then pulled out still farther, and then sheared.

In the accompanying drawings, Figure 1 illustrates a longitudinal vertical section of an ordinary shearing-machine with my invention applied thereto. Fig. 2 is a side elevation of that portion of the machine which bears the toothed cylinders and the operating mechanism. Fig. 3 is an edge view of the operating-pulleys and their connecting-belts. Fig. 4 is a detail in side elevation of a modification of the operating mechanism. Figs. 5, 6, and 7 are details, enlarged, of the toothed cylinders. Fig 8 is a detail view showing roller-adjusting mechanism.

Similar letters represent like parts in all the figures.

A represents the ordinary rotary shears for shearing the nap of the cloth, and B is the bar for guiding the cloth to the shears.

C is a rotary cylinder located some distance below the shears A and journaled in the frame of the machine transversely to the same and parallel with said shears. This cylinder C has its periphery covered with straight wire clothing or teeth $a$.

D is a similar cylinder to C, needle-pointed teeth $b$ extending from its periphery, and which is located back of the cylinder C and journaled parallel with the same.

E is a rotary cylinder journaled back of the cylinder D, parallel with the same, and on substantially the same horizontal plane. From the periphery of the cylinder E project teasel-shaped teeth $c$, extending from left to right toward the front of the machine.

The three cylinders C, D, and E are all made to revolve in the same direction and from left to right toward the front of the machine by any appropriate mechanism.

F is a cylinder having needle-pointed teeth $d$ extending from its periphery, and which is journaled below the cylinders D and E and under a plane connecting the same, and which cylinder F is adapted to rotate in either direction. Pivoted above the cylinder C are the arms G and H. The arms G on each side of the machine form journal-bearings for a transverse roller I, and the arms H support in a similar manner the roller K.

L, M, P, and Q are similar arms to G and H. The arms L and M are pivoted above the cylinder D, and the arms P and Q are pivoted above the cylinder E. The arms L support the roller N, and the arms M, P, and Q support, respectively, the rollers O, R, and S.

The arms G and H are connected by a right and left screw T, the right screw passing through one arm and the left screw passing through the other arm, so that by turning said screw the arms and their connecting-rollers I and K will either move toward or away from each other. The arms L and M and P and Q are similarly connected by the right and left screws U and V, respectively.

W and W' are two transverse parallel rollers, which are located below the cylinder C and journaled, respectively, near a vertical tangential plane from the front and back of said cylinder.

X X' and Y Y' are transverse parallel rollers, which are journaled below the cylinders D and E, respectively, the rollers X X' being in front of the cylinder F and the rollers Y Y' behind said cylinder. These rollers X X' and Y Y' are journaled at their ends in boxes $e$, disposed in longitudinal slots $e'$ in a horizontal portion Z of the frame of the machine. These boxes and rollers can be adjusted by threaded rods $e^2$ (see Fig. 8) and moved in the desired direction. It is obvious, however, that this adjustment may be effected by any well-known means.

In place of the mechanism above described the rollers X X' and Y Y' may be journaled in arms similar to G and H and adjusted in a similar manner.

Between the cylinders D and F are guide-rolls $f$ and $g$, and between the cylinders E and F are similar guide-rolls $h$ and $i$.

The cylinders C, D, and E are made to rotate in the same direction by any well-known mechanism, and the cylinder F may revolve in the same direction with the other cylinders or not, if desired.

Figs. 2 and 3 represent a simple arrangement of pulleys and belts for making all the cylinders revolve in one direction, and Fig. 4 represents mechanism by which the cylinder F will be made to revolve in the opposite direction from the other cylinders.

Keyed to the shaft of each cylinder C, D, E, and F are pulleys C', D', E', and F', respectively. G' is a belt which extends around the pulleys C' and D' to cause them and their cylinders to rotate in the same direction, and H' is a belt extending around and inclosing the pulleys D', E', and F' to connect the two pulleys E' and F' with the pulley D' and to cause them all to revolve in the same direction.

When it is desired to rotate the cylinder F in the opposite direction from the other cylinders, the belt H' passes from the pulleys D' and E' around two guiding-pulleys I I'—one on each side of the pulley F'—and then up over the said pulley F'.

K' L' are fixed and loose pulleys, respectively, which are hung upon the shaft of the cylinder C and by which the motion is transmitted to the several cylinders. The arrows in Figs. 2 and 4 show the direction of rotation of the cylinders when the pulley C' is revolved from left to right and in the proper direction.

The operation of the machine is as follows: The cylinders are put into operation, as above described, and the cloth M' is fed between the shears A and the bar B. The cloth is then passed back of and against the guide-roll I, down past the teeth a of the cylinder C, in front of and around the bottom of the roll W, underneath and back of the roll W', up past the teeth a again, over the roll K, over and back of the roll N, down past the teeth b of the cylinder D, in front of and under the roll X, under and back of the roll X', up past the teeth d of the cylinder F, between the guide-rolls f and g, up past the teeth b of the cylinder D, in front of and over the roll O, over and back of the roll R, down past the teeth c of the cylinder E, between the guide-rolls h and i, down past the teeth d of the cylinder F, underneath the rolls Y and Y', up past the teeth c of the cylinder E, in front of and against the roll S, and from thence around appropriate rollers and guides under the working parts of the machine and up in front of the same, where the cloth is connected to form an endless belt, and the above operation is repeated and automatically continued as long as desired. The first time the cloth passes between the shears A and the bar B the former has no duty to perform; but the second time, when the loops of the cloth have been pulled out, the shears A operate to cut the same. When the cloth M' passes down and up against the teeth a of the revolving cylinder C, the latter acts as a "breaker" to open out the felt of the cloth. The teeth b of the second cylinder D begin the process of combing out the nap or loops of the cloth without breaking them. The third cylinder gigs the cloth, the teasel-shaped teeth c giving the cloth a long and lofty nap or loop, and the cloth is then carried to the shears and the nap or loops are cut. By means of the rolls I K N O R S X X' Y Y' and the adjusting mechanism for the same above described the cloth may be brought nearer to or drawn farther away from the teeth on the cylinders to adapt the same for different kinds of cloth and different kinds of finishing for the same. By the rollers above named and their adjusting mechanism the cloth may be drawn away from any of the cylinders or brought into contact again, so as to either be treated by said cylinder or not, as desired. The three cylinders C, D, and E operate upon the outer surface of the cloth, and the cylinder F is adapted to operate upon the under surface of the cloth to raise a nap or make the under surface rough. If this be not desired, the cloth may be drawn away from connection with said cylinder by the means hereinbefore described.

What I claim as new, and desire to secure by Letters Patent, is—

1. The improved machine for finishing cloth, consisting of a series of rotary cylinders for breaking, combing the nap or loops, and gigging, respectively, in combination with rotary shears for cutting the nap and guide-rollers for guiding the cloth to said rollers and shears, as set forth.

2. The combination of the three rotary cylinders C, D, and E, with their respective straight teeth a, needle-like teeth b, and teasel-shaped teeth c, with guide-rollers in proper positions to guide the surface of the cloth to the teeth of said cylinders, all as set forth.

3. In combination with the three rotary cylinders C, D, and E and their respective straight teeth a, needle-like teeth b, and teasel-shaped teeth c, the rotary shearer and guide-rollers in proper positions to guide the surface of the cloth to the teeth of said cylinders and to the shears, all as set forth.

4. In combination with the series of rotary cylinders for breaking, combing, and gigging, respectively, a cylinder having pointed teeth on its periphery for gigging the under surface of the cloth simultaneously with the operation of the series of cylinders, and guide-rollers for guiding the cloth to the cylinders, substantially as set forth.

In testimony whereof I have signed my name to this specification, in the presence of two subscribing witnesses, this 4th day of October, A. D. 1889.

HENRY S. GREENE.

Witnesses:
ARTHUR W. CROSSLEY,
A. D. HARRISON.